(12) United States Patent
Yaacovi

(10) Patent No.: US 7,249,107 B2
(45) Date of Patent: Jul. 24, 2007

(54) REDISTRIBUTION OF RIGHTS-MANAGED CONTENT

(75) Inventor: Yoram Yaacovi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 09/909,673

(22) Filed: Jul. 20, 2001

(65) Prior Publication Data

US 2003/0018582 A1     Jan. 23, 2003

(51) Int. Cl.
*G06Q 99/00* (2006.01)
(52) U.S. Cl. .............................. 705/59; 705/57; 705/51
(58) Field of Classification Search .................. 705/59, 705/57, 58, 51; 380/200–204; 713/156, 713/173
See application file for complete search history.

(56) References Cited

U.S. PATENT DOCUMENTS

| | | | | |
|---|---|---|---|---|
| 5,715,403 | A * | 2/1998 | Stefik | 395/244 |
| 5,845,281 | A | 12/1998 | Benson et al. | 707/9 |
| 5,892,900 | A | 4/1999 | Ginter et al. | 395/186 |
| 6,141,754 | A | 10/2000 | Choy | 713/200 |
| 6,185,683 | B1 | 2/2001 | Ginter et al. | 713/176 |
| 6,226,618 | B1 | 5/2001 | Downs et al. | 705/1 |
| 6,824,051 | B2 * | 11/2004 | Reddy et al. | 235/380 |
| 6,876,984 | B2 * | 4/2005 | Tadayon et al. | 705/51 |

FOREIGN PATENT DOCUMENTS

JP     02005301587 A  * 10/2005

* cited by examiner

*Primary Examiner*—Pierre Eddy Elisca
(74) *Attorney, Agent, or Firm*—Woodcock Washburn LLP

(57) ABSTRACT

A technique for content redistribution. Digital content is packaged, and the package is associated with a first license that permits usage of the content on a first device. The first license also specifies the conditions upon which the content may be redistributed and licensed for use on a second device. When a content package is sent to the second device, the second device engages in a re-licensing transaction to obtain a second license that permits use of the content on the second device. Creation of the second license takes place according to conditions specified in the first license. For example, these conditions may specify a price for the second license, and/or a requirement that a portion of the purchase price be paid back to the owner of the first license, and/or a requirement that the first license be revoked upon creation of the second license.

18 Claims, 5 Drawing Sheets

REDISTRIBUTION OF RIGHTS-MANAGED CONTENT

FIELD OF THE INVENTION

The present invention relates generally to the field of digital rights management. More particularly, the invention relates to digital content such as books, audio, video, etc., where use of the content is controlled by a license, and where the license governs the terms on which the content may be redistributed from its original owner to a third party.

BACKGROUND OF THE INVENTION

The electronic distribution of information in digital form is becoming increasingly common. Since the invention of the printing press, mass distribution of textual information has generally occurred on paper. Due to the ease of distributing and using information in electronic form, print and paper as means for distribution of textual information are no longer the unchallenged standard, and many consumers (and distributors) prefer information to be in an electronic form. Likewise, much audio and video content is distributed in electronic digital form. However, the distribution of information in electronic form gives rise to various problems.

One problem that is well-documented is the fact that digital electronic information can be copied much more easily than its physical counterpart, which may violate the copyright of the content creator. A paper book can be copied using a photocopier, but doing so is inconvenient and expensive, and, a photocopy of a paperback book is likely to be larger, heavier, and of lower quality than the original. These problems deter copying of books and encourage those interested in receiving the information to purchase a new copy, or, at least, to purchase a "used" original. Similarly, audio and video have traditionally been distributed in a tangible analog format such as analog magnetic tape, vinyl disk, film, etc., which can be copied, but any copy is likely to be of lower quality. Commercial audio and video have, for some time, been available in digital format (e.g., Compact Disc (CD), Video LaserDisc, Digital Versatile Disk (DVD)), and the problem of copying is rapidly becoming evident.

The problem of copying digital content is exacerbated by the fact that digital content cannot easily be "re-sold." In the physical world, a book, analog videocassette, audio vinyl disk recording, etc., can be sold from its original owner to a secondhand purchaser. This may be an advantageous transaction for both parties: the secondhand purchaser acquires a used copy of a book, record, videocassette, etc. at a reduced price as compared with the cost of a new copy, and the seller may be able to get some money for an item that he or she no longer needs or wants. This situation has no analogue in the digital world. A first user of digital content generally transfers that content to a second user by making a copy of the content (e.g., by copying it to a floppy disk, or transmitting a copy over the Internet). Once the copy is made, the first user has no incentive to destroy the old copy, since both copies are equally good and equally usable. In other words, in contrast with the physical world, transfer of content in the digital world does not normally deprive the original owner of the content. Thus, a person who wants to acquire a copy of digital content must purchase it new or make an (often illegal) copy. In theory, the legal terms of a copyright license for the content may require payment to the owner of the content at the time the copy is made, but compliance with such terms is rare at best.

Various Digital Rights Management (DRM) systems have been developed to ensure that each user purchases a new copy of a given piece of content. For example, the Microsoft® eBooks system, in one embodiment, permits content to be licensed for use only on computing devices that are registered to a particular user, and denies usage of the same content on other computing devices. This essentially encourages anyone who wants a copy of the content to purchase it at full price. However, the content may not be of sufficient value to a given person to induce him or her to buy a new copy. Such a prospective purchaser is left with three choices: either (1) pay the new-copy price, (2) do without the content, or (3) illegally pirate the content. This cost of this choice is realized in the form of an enormous amount of illicit copying, as well as new-purchase transactions that never take place because the cost is too high. It would be advantageous if digital content could be "re-sold" on some terms that result in a reduced price for the purchaser, while still allowing the publisher or other copyright owner to receive compensation for every outstanding copy of the digital content. This would allow those who would normally buy used paper books, records, videos, etc., at a reduced price to engage in analogous transactions in the digital content world.

In view of the foregoing, there is a need for a system that overcomes the drawbacks of the prior art.

SUMMARY OF THE INVENTION

The present invention provides a system and method for distributing protected digital content in a manner that permits the content to be redistributed in a limited fashion. The limited redistribution of digital content creates a situation that is somewhat analogous to the re-sale of a "used" book, record, cassette, etc.

Content is initially distributed in the form of a "protected content package." A license is associated with the protected content package (e.g., by including the license in the package itself, or associating a separate license file with the package), and the content contained in the content package can be used only in accordance with the terms of the license. As one example, the content may be stored in the content package in an encrypted form, such that the content is decryptable only by a decryption program that is trusted to obey the terms of the license. The license, for example, may permit rendering of the content (e.g., display of text or video on a monitor, playing audio through speakers, etc.), but not printing or recording of the content. The license may also permit usage of the content on a particular computing device or group of computing devices, but may deny usage on other devices. One term in the license in accordance with the invention is a "redistribution" term, which governs whether the content can be licensed for use on a device other than the one(s) on which it is currently licensed and, if so, what actions are to take place upon such relicensing.

As one example, suppose that a particular piece of content (e.g., an electronic book) is purchased new for $10. A license associated with a given piece of content may specify that the original purchaser of the content can give one copy of the content to another user, and that the receiving user can purchase a license for this copy for $8 (to be paid to the publisher), $2 of which is to be returned to the original purchaser who redistributed the copy (as an incentive for that user to engage in such redistribution). The license may further specify the number of times (e.g., one) that the original purchaser can perform this redistribution. This scenario is advantageous for all of the parties concerned: the publisher benefits from a sale that might otherwise not have taken place, while being assured of payment for every outstanding usable copy of the content; the original purchaser gets a payment for redistributing the content; and the secondary purchaser gets a copy of the content at a reduced price.

In an exemplary scenario, the original content is distributed by the publisher to a first user in a package that contains both the encrypted content and a digital license that permits the first user to render the content. The first user transmits a copy of the content package to a second user—e.g., by copying the content package onto a floppy disk, by E-mailing the content package over the Internet, etc. The second user now has a copy of the content package, but cannot render the content because the content is in encrypted form and the terms of the existing license do not permit the second user to render the content. The second user then contacts a licensing authority, who may be identified in the content package's license. The second user transmits (e.g., by way of the Internet, etc.) a copy of the relicensing terms (or, in some instances, the entire license or the entire content package) to the licensing authority. The licensing authority determines that the content may be re-licensed to the new user on particular terms. In the above example, the second user must pay $8 for a new license, and the first user is entitled to $2 of this payment. The licensing authority (or some other entity acting on the licensing authority's behalf) engages in a payment transaction (e.g., using a credit card) to obtain the second user's $8 payment, and then transmits $2 to the first user. The licensing authority (or other entity) then creates a new license for the content package and transmits this license to the second user. Since the second user is a secondary purchaser of the content, the second user's license may, optionally, omit the redistribution privilege. The license may be transmitted to the second user in one of several ways—e.g., by transmitting a new content package containing the new license, by transmitting a new license with instructions to insert it in the second user's copy of the content package, by transmitting an instruction to be carried out by the second user's computer as to how to rewrite the original license, etc. Once the second user has obtained the license, the second user may render the content on his or her computing device.

Relicensing terms other than the one described above may also be used. For example, a relicensing term could permit resale of the content and require revocation of the original license as a condition to the sale. This term could be enforced by requiring that, at the time of relicensing, the licensing authority instruct the first user's computer to void the original license. It should further be appreciated that the above-described technique can be adapted for use with all types of content—e.g., text, audio, video, multimedia, software, etc.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

As computers and similar devices become more available, and data-transmission bandwidth increases, the sale and distribution of content in digital form has become commonplace, and is replacing more traditional means of distribution such as print-and-paper books. While digital content distribution has many similarities to its physical counterparts, one area that has previously been reserved for the physical domain is redistribution of content (e.g., sale of a "used" book, record, cassette, etc.) on terms that do not deprive a copyright owner of a legitimate licensing fee. A Digital Rights Management (DRM) system can be adapted to provide for the re-sale of digital content, as described below.

Exemplary Computing Environment

Figure 1:
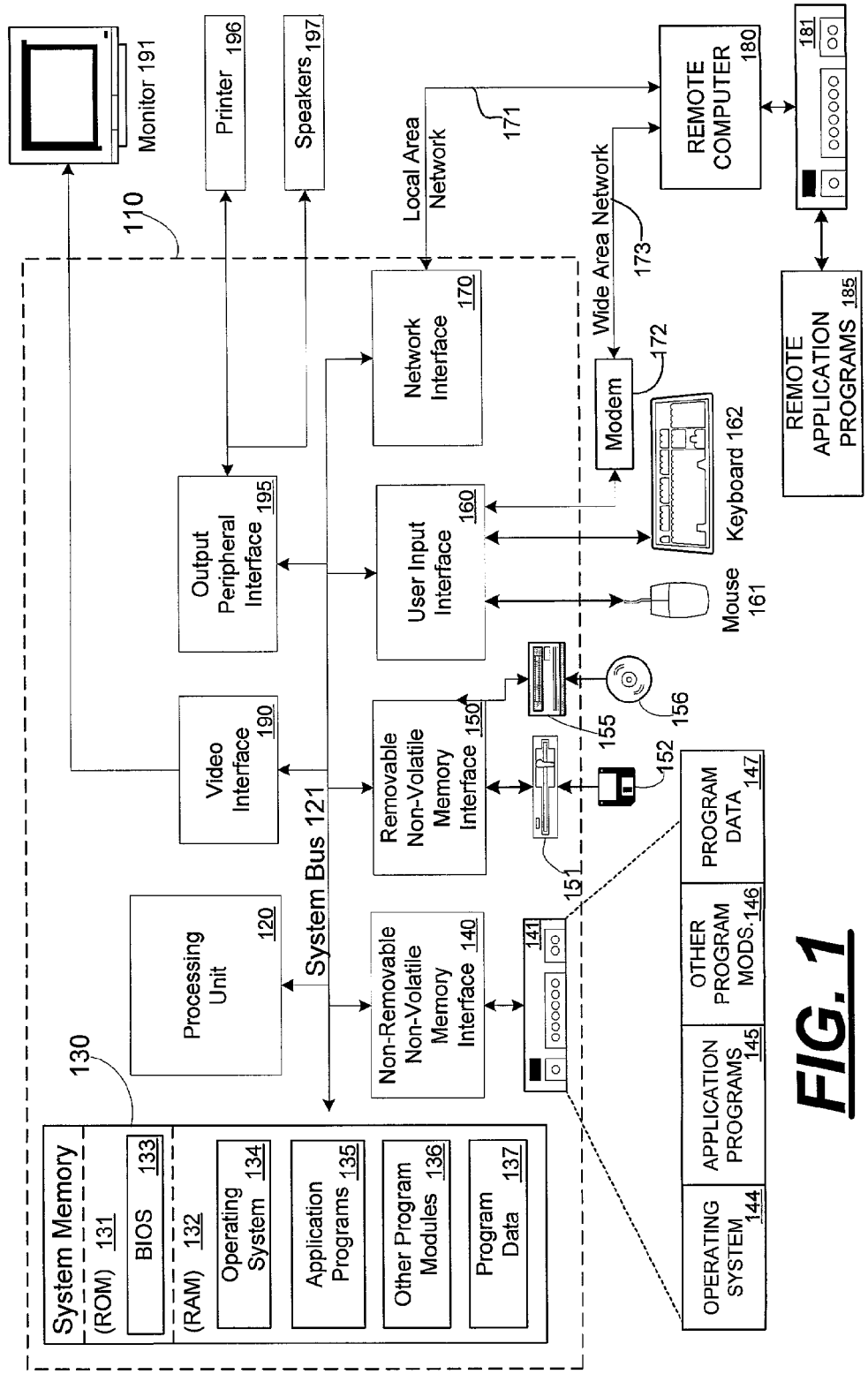
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Content Distribution Architecture

Figure 2:
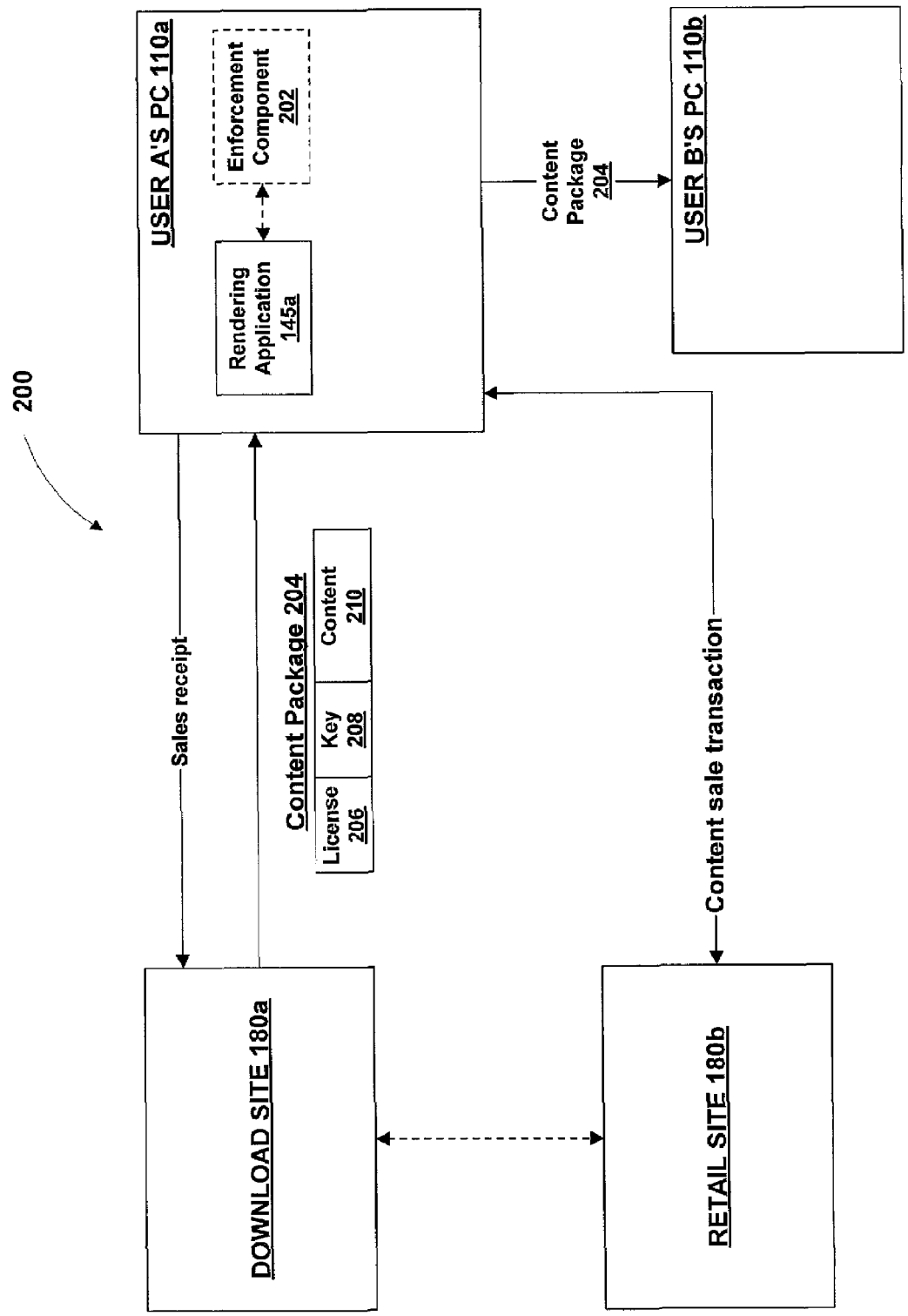
FIG. 2 is a block diagram of an architecture for the distribution and redistribution of content in accordance with aspects of the invention.

FIG. 2 shows an architecture 200 that supports the distribution and redistribution of content. Architecture 200 supports the distribution of a content package 204, such as an eBook. An eBook is a type of digital content package that is known in the art. eBooks are described generally in the Open eBook specification available at http://www.openebook.org/oebpsdownload.htm. As the name "eBook" implies, content 210 may be the text of a book, although it will be understood that eBook 210 may contain other types of digital content, such as audio, video, multimedia, software, etc.

In the example of FIG. 2, content package 204 includes a license 206, a key 208, and content 210. Content 210 is the actual digital content contained in content 204. Content 210 is preferably encrypted, so as to limit unauthorized access to or viewing of content 210. Key 208 is preferably a symmetric key with which content 210 is encrypted. License 206 contains the terms and/or conditions upon which content 210 may be decrypted and accessed. For example, license 206 may contain terms (either explicitly or by default) that permit content 204 to be rendered on computing device 110a (or on a set of computing devices belonging to, or registered to, a particular user such as user A), but may prohibit rendering on other devices (e.g., computing device 110b associated with user B). License 206 and the terms that it may contain are more particularly discussed below. License 206, key 208, and content 210 may be cryptographically "sealed"; cryptographic sealing is known in the art and thus is not described at length herein. While the format of content package 204 depicted in FIG. 2 is exemplary, it will be understood that the present invention is not limited to the format shown, and the invention may be used with other types of content packages regardless of whether such content packages are in the format of content package 204, regardless of whether content 210 is encrypted, and regardless of whether the components of the content package are contained in a single data structure or distributed over several data structures.

Content package 204 originates at a download site 180a. Download site 180a is typically a computing device such as computer 110 depicted in FIG. 1. Download site 180a transmits content package 204 to the computing device 110a of user A (labeled "User A's PC" in FIG. 2). Computing device 110a, like download site 110a, is preferably device such as computer 110 shown in FIG. 1. Although FIG. 2 labels computing device 110a as a PC, it will be understood that computing device 110a may be any device, whether or not such a device is a typical personal computer. For example, computing device 110a may be a handheld computer, a dedicated eBook-reading device, a dedicated audio rendering device, a laptop, etc. Download site 180a and computing device 110a have been numbered as such to show that the relationship of these devices is similar to that of computer 110 and remote computer 180 in FIG. 1 (i.e., connected by a communications means, such as wide area network 173), although it will be understood that either of download site 180a and computing device 110a may be any type of computing device, and are not limited to the "computer" and "remote computer" shown in FIG. 1.

Computing device 110a preferably contains a rendering application 145a that permits the rendering of content 210 in content package 204 and enforces the terms of license 206. For example, rendering application 145a may be an eBook reading application 145a that works with the format of exemplary an eBook and renders textual content contained of an eBook, although it will be appreciated that the invention contemplates the use of any type of rendering application as may be appropriate for the nature of content 210 and format of content package 204. Optionally, rendering application 145a may be associated with a separate component 202 that performs the evaluation and enforcement of license 206, and that performs the decryption of content 210. Examples of rendering application 145a include the Microsoft® eBooks Reader distributed by Microsoft Corporation of Redmond, Wash., which is available at http://www.microsoft.com/reader/default.asp, and Windows Media™ Player, also distributed by Microsoft Corporation and available at http://www.microsoft.com/windows/windowsmedia/en/software/playerv7.asp. A word processor is also an example of a rendering application, and it will be understood that the foregoing examples are not limiting of the invention. In the example of the Microsoft® Reader application, that application has a rendering component, and a separate executable called a "black box" or "secure repository" that couples to the rendering component and performs evaluation and enforcement of licenses, and decryption of content. This "black box" or "secure repository" is an example of enforcement component 202. As an alternative to a separate enforcement component 202, rendering application 145a may contain means (e.g., executable code) that evaluates and enforces licenses and/or performs decryption without the need for a separate enforcement component 202.

In one embodiment of the invention, content package 204 is purchased in a commercial transaction. For example, a user (e.g., "user A" who owns computing device 110a) may purchase content package by submitting a credit card number to download site 180a, with instructions to charge ten dollars to the user's credit card. As another example, the sales and download functions may be "de-coupled"—that is, the sale and download of content package 204 may be performed separately at different sites. For example, retail site 180b (which may be a computing device of the type depicted in FIG. 1), may engage in the sales transaction with user A's computing device 110a, wherein the result of the transaction is that the user is provided with an electronic sales receipt; the user then provides the electronic sales receipt to download site 180a in order to obtain content package 204. This second example generally requires that retail site 180b and download site 180a have a pre-existing contractual relationship with each other (shown in FIG. 2 by the dashed line connecting sites 180a and 180b), whereby download site 180a has agreed to download content packages 204 that retail site 180b markets. A non-limiting example of such a system is the Microsoft® eBooks system, wherein a retail site sells eBooks by completing a credit card transaction with a purchaser and providing the user with a POST request that contains the Universal Record Locator (URL) of a download server that will complete the download of the eBook, and an encrypted POST that describes the eBook (and, optionally, the terms of its corresponding license) that the purchaser has purchased. It will be understood, however, that any transactional architecture whereby a user may purchase content package 204 is within the spirit and scope of the invention.

In accordance with the invention, a user (e.g., "user A") may send a copy of content package 204 from computing device 110a to computing device 110b (which may be a computing device of the type depicted in FIG. 1, and which may belong to a different user, such as "user B"). In a typical scenario, computing devices 110a and 110b are connected by a wide-area network, such as the Internet, and content package 204 is an ordinary file that can be sent from one device to another over such a network. (It should be understood that, while "user A" may be a genuine end-user of content who sends content to a "friend" who owns computing device 110b, it may also be the case that user A is a businessperson who is in the business of selling "secondhand" digital content.) Computing device 110b may have installed thereon a rendering application 145a, which may be the same rendering application that is installed on computing device 110a. As noted above, the terms of license 206 may not permit rendering application 145a to decrypt and render content 210 on computing device 110b, and the present invention provides a process whereby a content package 204 that is licensed to computing device 110a may be transmitted to, and licensed for use on, computing device 110b.

In accordance with a feature of the invention, the fact that computing device 110b receives content package 204 from computing device 110a (rather than purchasing it directly from download site 180a or from retail site 180b) may create certain conditions on the licensure to computing device 110b, or actions that must be performed as a consequence of licensing content package 204 to computing device 110b. For example, computing device 110b may be required to pay for the license, but may be entitled to obtain the license at a discounted rate due to the fact that computing device 110b received content package 204 from another user rather than purchasing it directly from the retailer; this scenario is, in some sense, the digital world's analogue of a "used book sale," because user B is paying a discount for receiving a book "secondhand" from user A. As another example, a portion of user B's purchase price may be transmitted to user A as a "referral fee." Other exemplary scenarios are discussed below.

Exemplary License Supporting Redistribution of a Digital Content Package

Figure 3:
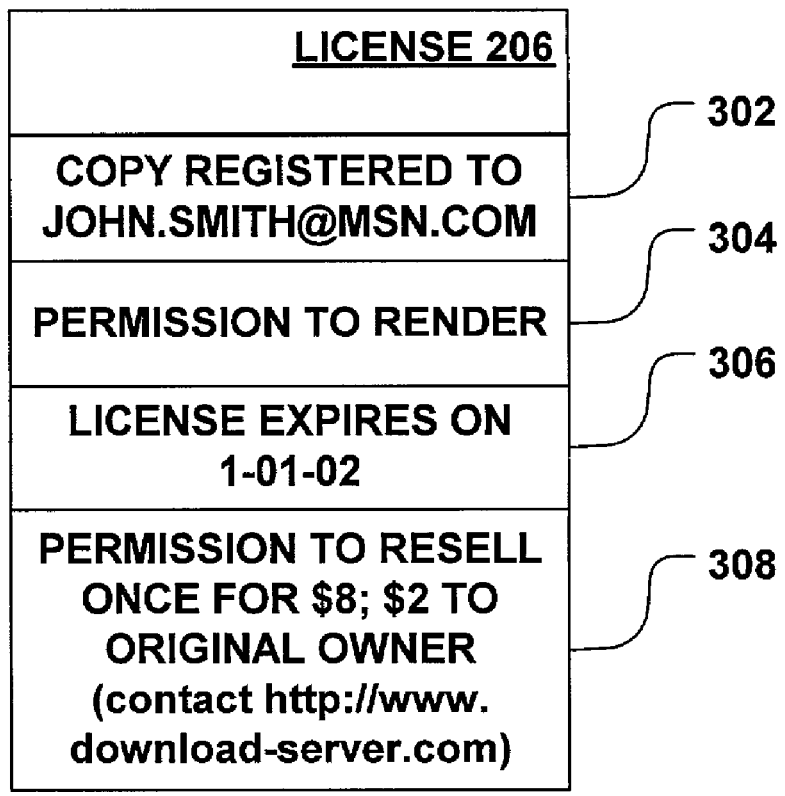
FIG. 3 is a block diagram of a license data structure in accordance with aspects of the invention.

FIG. 3 shows the detail of exemplary license 206. License 206 contains a set of terms 302-308. For example, term 302 says that copy of content 210 contained in content package 204 is "registered to John.Smith@msn.com." This term 302 means that content package 204 is usable on devices that are registered to the specified user, who is identified in this example by an E-mail address. Term 304 indicates that the registered user has permission to render the content (e.g., display text content on a monitor, play audio content on a speaker, etc.) Term 306 is another example of a term, which states that the license expires on Jan. 1, 2002. Term 308 grants the licensee the right to resell the content for eight dollars, and specifies that, upon such a resale, two dollars of the sale price will go to the original owner. There may be additional terms in the license, but terms 302-308 are exemplary of the types of terms that may appear in the license.

Term 308 is significant because it supports the controlled redistribution of content package 204. That is, term 308 allows the owner of content package 204 to sell a copy of content package 204, while ensuring that this resale happens only on terms that are acceptable to the original licensor of content package 204. In the example of FIG. 3, the licensor has granted the licensee permission to resell content package 204, subject to the following conditions: (1) only one resale is permitted; (2) the price of the resale is eight dollars; and (3) the original content package owner gets to keep two dollars out of the eight-dollar resale price.

Exemplary term 308 is particularly advantageous, because it supports a model that is very similar to the real world: a consumer may purchase a book (or CD, or VHS tape, etc.) as a new item, and then later re-sell it for a discount. Because books and CDs are physical items, it is only possible for the original owner to sell a used book or CD once. Although there is no such inherent limit on reselling digital content (since the digital content may be copied an arbitrary number of times), term 308 uses a license term to emulate this situation by specifying that the re-sale may only occur once. It will be appreciated that term 308 does not perfectly emulate the scenario of reselling a used book or CD, because the original owner of content package 204 still keeps content package 204, and because the original owner does not get the entire proceeds of the sale. However, it may be possible to devise other license terms that can emulate, in the digital world, various aspects of physical property resale. (It is also possible to create other license terms that support other business models.) The following is a non-exhaustive, non-limiting set of exemplary terms that support various business models for digital content distribution:

A term that permits the user to re-sell the digital content package at a discount from the original price and keep the entire proceeds of the sale (as opposed to keeping only a portion of the proceeds, as specified in exemplary term 308)

A term that permits the user to re-sell the digital content package a finite number of times (e.g., two, three, four, etc.)

A term that permits the user to re-sell the digital content package, whereupon the original user's license in the content package is revoked. This scenario most closely emulates the resale of a physical book, CD, etc., because it supports the model that the content owner should receive payment for any increase in the number of users who can access the content package concurrently, while still allowing content to move from user to user without payment to the publisher when the total number of users who can concurrently use the content does not increase.

Enforcement of License Terms that Support Digital Content Redistribution

Figure 4:
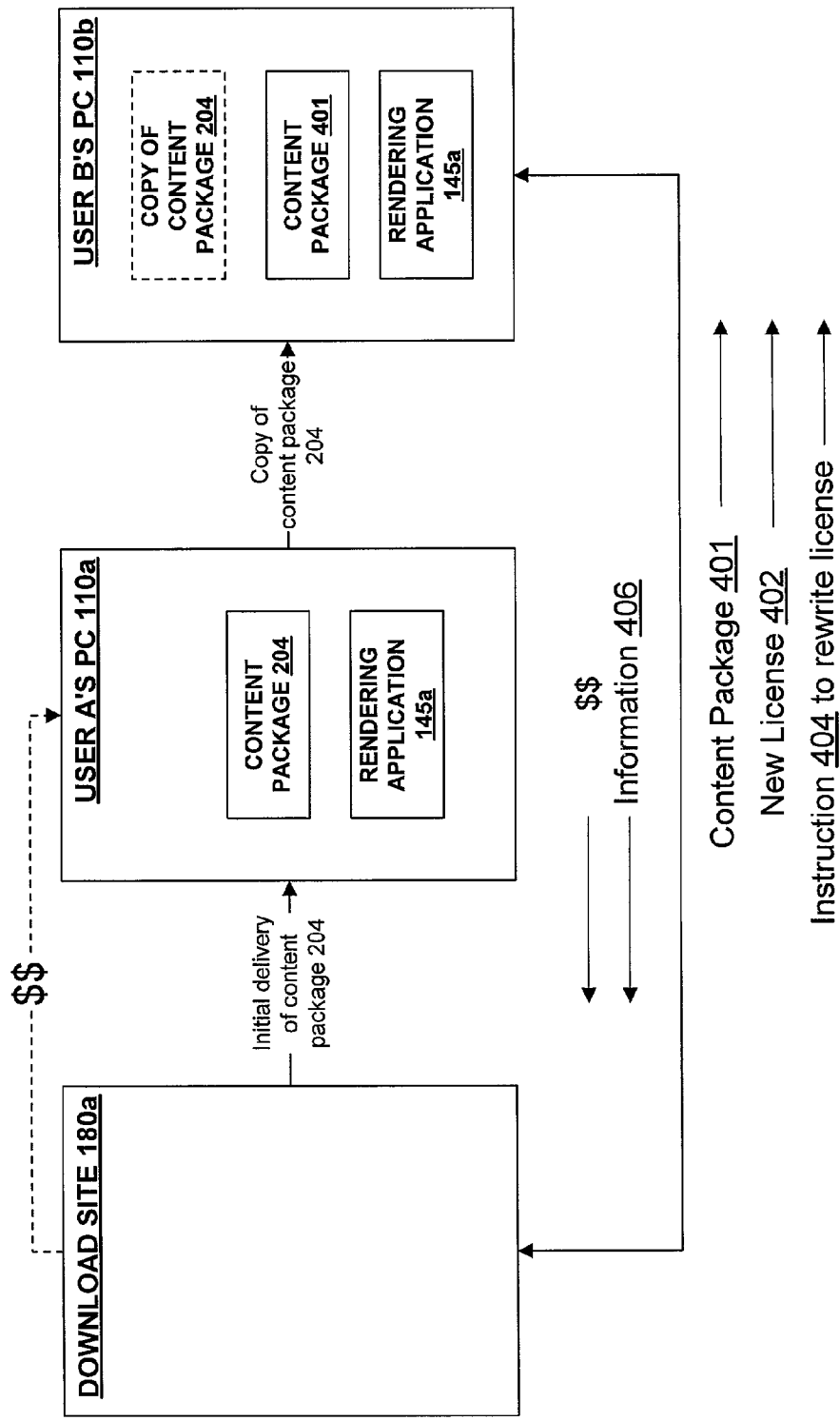
FIG. 4 is a block diagram showing the flow of content and other information through an exemplary electronic distribution architecture that supports distribution and redistribution of content.

The discussion of FIG. 3 above shows various examples of license terms that support redistribution of digital content. FIG. 4 shows the use of a content distribution architecture to support the controlled redistribution of content package 204. As a specific example, FIG. 4 shows the use of a content distribution architecture to redistribute content package 204 from "user A" to "user B."

As noted above in connection with FIG. 2, content package 204 originates at download site 180a, and is initially delivered to computing device 110a. This initial delivery may, for example, be part of a purchase transaction as described above in FIG. 2, although it will be appreciated that the initial delivery of content package 204 need not result from a purchase. For example, content package 204 may be initially delivered as a gift, as a "free promotional item," etc. Typically, delivery of content package 204 occurs through a wide area network, such as the Internet, that connects download site 180a with computing device 110a, although the delivery may take place through any means that allows data to be delivered from one point to another (such as physical delivery of a data-carrying medium, such as a portable magnetic disk, optical disk, flash card, memory stick, etc.).

Content package 204, once delivered to computing device 110a, may be used in accordance with the terms of the license 206 (shown in FIG. 2) that is associated with content package 204. As discussed above, license 206 may, for example, permit the content 210 (also shown in FIG. 2) contained in content package 204 to be rendered on computing device 110a, but not on any other computing device. Although license 206 may only permit content 210 to be rendered on computing device 110a, content package 204 itself may be freely transferable from one computing device to another. Thus, in the example of FIG. 4, computing device 110a transmits a copy of content package 204 to computing device 110b. The copy of content package 204 is stored in the memory of computing device 110b (e.g., hard disk 141 shown in FIG. 1, or some other type of memory accessible to computing device 110b, such as a flash card, memory stick, removable disk, etc.). If the copy of rendering application 145a residing on computing device 110b attempts to decrypt and render content package 204, it will discover that content package 204 is not licensed for use on computing device 110b. The operator of computing device 110b (i.e., "User B") will have to contact a licensing authority to obtain licensure of content package 204 on computing device 110b. In the example of FIG. 4, the relevant licensing authority is download site 180a, although it will be understood that the licensing authority need not be the original source of the download, and could be a separate license server.

Computing device 110b engages in a relicensing transaction with the licensing authority (download site 180b, in this example). The nature of this relicensing transaction is governed by the relicensing term of license 206. In this case, relicensing term 308 (shown in FIG. 3) permits computing device 110b to obtain a license for eight dollars, with the conditions that two dollars from the purchase price will be forwarded to the original licensee, and that content package 204 can only be "redistributed" one time. Additionally, relicensing term 308 contains the address of the relicensing authority (in this example, http://www.download-server.com); including this address in the license allows computing device 110b to know how to contact the relevant licensing authority.

In order to engage in a relicensing transaction with download site 180a, computing device 110b transmits relevant information from content package 204 to download site 180b, so that download site 180a will know on what terms the relicensure is to take place and so that download site 180a can enforce those terms. For example, computing device 110a may transmit relicensing term 308, the identity of the original owner of content package 204 (contained in term 302), and information that identifies content package 204, etc. If content package 204 is small, it may be convenient to transmit the entirety of content package 204 to download site 180a. On the other hand, if the content package 204 is large, it may be more convenient to distill the relevant information from content package 204 (e.g., the identity of the content, the name of the original owner of the content, the relicensing terms, etc.). If content package 204 is cryptographically sealed, this distillation of information may need to be performed by rendering application 145a, since rendering application 145a is adapted to read the format of content package 204.

Once download server 180a has the relevant information, it proceeds to enforce the terms of the relicensure. For example, download server 180a may verify in its records that content package 204 has not been previously sold by the owner identified in term 302, since exemplary relicensing term 308 only permits one resale of content package 204. Assuming that relicensure of the content is permitted, download server 180a may engage in a credit card transaction with computing device 110b in order to collect the specified "resale" payment (eight dollars, in this example). After payment is collected, download server 180a may contact computing device 110a in order to provide the two dollar payment to which the original content owner is entitled under the terms of licensing term 308 (or may arrange for this payment to be deposited in some other place.) Other actions may also be taken depending on the conditions of relicensure specified in the relicensing term(s). For example, as noted above, a true "used book sale" scenario may be created whereby the original licensee's license is revoked upon resale; in this case, the download server may contact computing device 110a to instruct computing device 110a to revoke the original owner's license. (This revocation may be performed by rendering application 145a, which may be configured to rewrite license 206 in response to such an instruction.)

When download server 180a has fulfilled the conditions upon which content package 204 is to be relicensed, it relicenses content package 204 for use on computing device 110b. The act of relicensing may occur in various ways. The following is a non-exhaustive list of ways that content package 204 can be relicensed for use on computing device 110b:

Content server 180a may create a new content package 401 containing the original content 210 and a new license, and may download this new content package 401 to computing device 110b. This new content package is then installed on computing device 110b, where it may be rendered by rendering application 145a Content server 180a may create a new license 402 and transmit license 402 to computing device 110b. Computing device 110b, in this case, contains logic (e.g., inside of rendering application 145b) which modifies content package 204 by inserting license 402 in place of original license 206.

Content server 180a may send an instruction 404 that instructs computing device 110b to modify content package 204 to contain the new license. Computing device 110b, in this case, contains logic (e.g., inside of rendering application 145b) which modifies content package 204 in accordance with instruction 404.

The foregoing list is not limiting of the invention. It will be appreciated by those skilled in the art that any relicensing mechanism may be used that allows the redistributed content to be used on computing device 110b.

It should be noted that the new license obtained on computing device 110b may not have exactly the same terms as original license 206. For example, original license 206 may permits redistribution, but the new license may not permit further redistribution. The exact terms of the new license are governed by the particular redistribution business model (or other business model) that the owner of the copyright in the content seeks to implement. For example, a first copyright owner may wish to encourage high-volume redistribution by including a redistribution term in every license, regardless of whether the license resulted from a new purchase or a redistribution of the content. On the other hand, a second copyright owner may wish to reign in redistribution, and thus may grant the redistribution right only to users who purchase the content "new" from the content server without having been "referred" there by a "redistributor."

Figure 5:
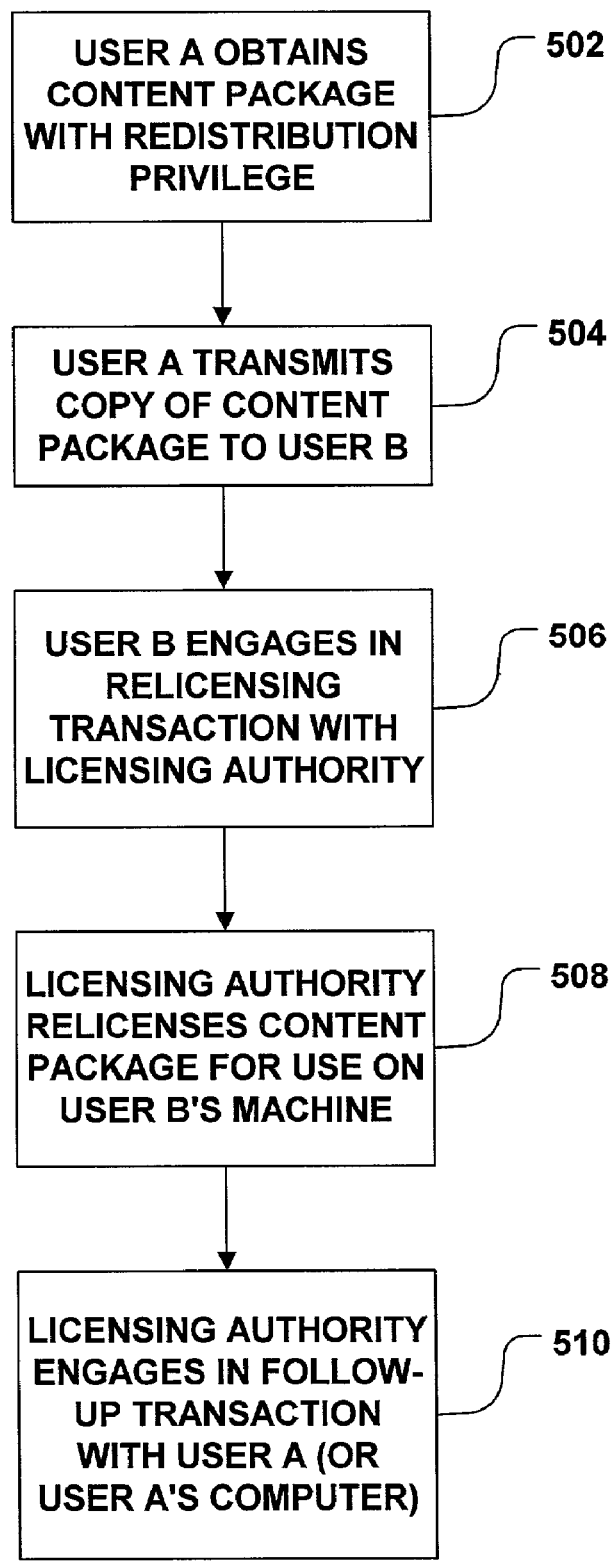
FIG. 5 is a flow diagram of exemplary steps performed during a redistribution process.

FIG. 5 shows, in the form of a flowchart, the process of redistributing and relicensing content package 204, as discussed above in connection with FIG. 4. At step 502, user A obtains content package 204, which has associated therewith a license term that grants some type of redistribution privilege. As discussed above, the nature of the redistribution privilege itself may have different parameters; license term 308 (shown in FIG. 3) is exemplary of redistribution terms.

At step 504, user A transmits a copy of content package 204 to user B. It should be noted that this transmission may take place at any point in time—i.e., it may take place at the same time that user A obtains the content package, or it may take place months, or even years, later. The transmission may occur over a wide area network, such as the Internet, but may occur by other means, such as user A's burning content package 204 onto an optical disk and physically mailing the optical disk to user B.

At step 506, user B engages in a relicensing transaction with a licensing authority, such as download site 180*a*. The licensing authority used for this transaction may be the same site that issued a license to user A at step 502; alternatively, the licensing authority that engages in a relicensing transaction at step 504 may be a separate device/entity. As noted above, the relicensing transaction may begin by user B transmitting relevant portions of content package 204 to the licensing authority, so that the licensing authority can determine the requirements for relicensure of content package 204 to user B. For example, user B may transmit the license portion of content package 204 to the licensing authority, whereupon the licensing authority determines what user B must do to obtain a new license (e.g., pay a specified price). Also as part of step 506, user B satisfies the conditions for relicensure (e.g., by paying the required price).

At step 508, the licensing authority re-licenses content package 204 for use by user B. As noted above, the mechanics of this relicensing may occur by: providing user B with a new content package containing the original content and a new license; providing user B's machine with a new license to be inserted into content package 204; providing user B's machine with an instruction to create a new license; or any other mechanism that results in the existence on user B's machine of a content package that has a license permitting use by user B.

At step 510, the licensing authority optionally engages in a "follow-up" transaction with user A (or user A's machine). For example, if the terms governing relicensure that appear in the original content package 204 require that user A receive two dollars of user A's payment, then step 510 may include the action of providing this payment to user A. As another example, if the terms governing relicensure require that user A's license be revoked upon licensure of the content to user B, then step 510 may include the action of causing this license revocation. It should be noted that step 510 may, in practice, take place at the same time as the relicensing transaction. For example, if the terms governing relicensure require that user A's license be revoked when content package 204 is relicensed to user B, this revocation may happen prior to the relicensure that takes place at step 508. Thus, the "follow-up" transaction of step 510 may take place either before or after the relicensure of step 508, and the "follow-up" transaction may be part of (or intertwined with) the relicensing transaction of step 506. The follow-up transaction at step 510 need not take place directly between user A and the licensing authority, but may alternatively be performed using some type of intermediary, such as a clearance service.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of providing access to a first content package on a first computing device, the method comprising:
   receiving first data indicative of a first digital license, wherein the first digital license specifies one or more terms governing the relicensing of the first content package, wherein the first digital license is associated with the first content package and permits access to the first content package on a second computing device but not on the first computing device, and wherein the first content package is usable only in accordance with one or more digital licenses, said first digital license being one of said one or more digital licenses; and
   licensing the first content package for use on the first computing device in accordance with said one or more terms,
wherein the first content package comprises a content portion and the first digital license, and wherein said licensing act comprises:
   creating a second content package which comprises:
      said content portion; and
      a second digital license which permits access to said second content package on the first computing device;
   transmitting said second content package to the first computing device; and performing at least one action in compliance with a first one of said one or more terms, wherein said first term requires revocation of the first digital license, and wherein said at least one action comprises sending an instruction to the second computing device which causes the second computing device to make the first digital license unusable.

2. The method of claim 1, wherein said first computing device associates said second digital license with the first content package.

3. The method of claim 1, wherein said licensing act comprises licensing the first content package for use on the first computing device in a manner that prohibits resale of the first content package.

4. The method of claim 1, wherein said receiving act comprises receiving the first content package.

5. The method of claim 1, wherein said receiving act comprises receiving the first digital license.

6. The method of claim 1, wherein said receiving act comprises receiving data which represents said one or more terms.

7. The method of claim 1, further comprising:
   determining that licensure of the first content package for use on the first computing device is consistent with a first of said one or more terms.

8. The method of claim 1, wherein said first term requires collection of a payment as a condition of licensing the first content package for use on the first computing device, and wherein said action comprises collecting said payment.

9. The method of claim 1, wherein said first term specifies that a payment is to be provided to a party associated with the second computing device, and wherein said action comprises providing said payment to said party.

10. One or more computer-readable storage media having computer-executable instructions to perform a method of providing access to a first content package on a first computing device, the method comprising:

receiving first data indicative of a first digital license, wherein the first digital license specifies one or more terms governing the relicensing of the first content package, wherein the first digital license is associated with the first content package and permits access to the first content package on a second computing device but not on the first computing device, and wherein the first content package is usable only in accordance with one or more digital licenses, said first digital license being one of said one or more digital licenses; and licensing the first content package for use on the first computing device in accordance with said one or more terms, wherein the first content package comprises a content portion and the first digital license, and wherein said licensing act comprises:

creating a second content package which comprises:
said content portion; and
a second digital license which permits access to said second content package on the first computing device; and transmitting said second content package to the first computing device, wherein the method further comprises:

performing at least one action in compliance with a first one of said one or more terms, wherein said first term requires revocation of the first digital license, and wherein said at least one action comprises sending an instruction to the second computing device which causes the second computing device to make the first digital license unusable.

11. The one or more computer-readable storage media of claim 10, wherein said first computing device associates said second digital license with the first content package.

12. The one or more computer-readable storage media of claim 10, wherein said licensing act comprises licensing the first content package for use on the first computing device in a manner that prohibits resale of the first content package.

13. The one or more computer-readable storage media of claim 10, wherein said receiving act comprises receiving the first content package.

14. The one or more computer-readable storage media of claim 10, wherein said receiving act comprises receiving the first digital license.

15. The one or more computer-readable storage media of claim 10, wherein said receiving act comprises receiving data which represents said one or more terms.

16. The one or more computer-readable storage media of claim 10, wherein the method further comprises:

determining that licensure of the first content package for use on the first computing device is consistent with a first of said one or more terms.

17. The one or more computer-readable storage media of claim 10, wherein said first term requires collection of a payment as a condition of licensing the first content package for use on the first computing device, and wherein said action comprises collecting said payment.

18. The one or more computer-readable storage media of claim 10, wherein said first term specifies that a payment is to be provided to a party associated with the second computing device, and wherein said action comprises providing said payment to said party.

* * * * *